United States Patent
McLoughlin

(10) Patent No.: US 7,882,204 B2
(45) Date of Patent: Feb. 1, 2011

(54) MAIL SERVER APPLIANCE AND SUPPORT SERVICE

(75) Inventor: Mark McLoughlin, Cork (GB)

(73) Assignee: Red Hat, Inc., Raleigh, NC (US)

( * ) Notice: Subject to any disclaimer, the term of this patent is extended or adjusted under 35 U.S.C. 154(b) by 973 days.

(21) Appl. No.: 11/559,367

(22) Filed: Nov. 13, 2006

(65) Prior Publication Data

US 2008/0114833 A1    May 15, 2008

(51) Int. Cl.
*G06F 15/177*    (2006.01)
(52) U.S. Cl. .................. 709/220; 709/221; 709/206; 709/203; 709/219
(58) Field of Classification Search .............. 709/203, 709/206, 207, 217, 218, 219, 220, 222, 225, 709/226, 229, 237
See application file for complete search history.

(56) References Cited

U.S. PATENT DOCUMENTS

| 7,360,078 B1 * | 4/2008 | Lebouill ............... 713/155 |
| 2006/0168164 A1 * | 7/2006 | Lemson et al. ............ 709/221 |
| 2007/0073819 A1 * | 3/2007 | Gardner et al. ............ 709/206 |
| 2007/0143432 A1 * | 6/2007 | Klos et al. ............ 709/206 |

* cited by examiner

*Primary Examiner*—Barbara N Burgess
(74) *Attorney, Agent, or Firm*—MH2 Technology Law Group LLP

(57) ABSTRACT

Embodiments of the present invention provide electronic mail that is easy to automatically setup. Embodiments of the invention provide a mail server appliance that is designed to operate with a support service. Each mail server appliance is pre-configured to use the support service as part of an integrated product. The mail server appliance is configured for ease of installation and maintenance and comprises the hardware bundled with the software applications pre-installed. The mail server appliance is also coupled to the support service and may begin operations almost immediately. The support service serves as the primary relay point for sending/receiving mail for the mail server appliance and provides various supporting features. First, it provides pre-installation services for the mail server appliance. Second, the support service provides flexible operations support. For example, the support service allows the mail server appliance to have a dynamically assigned IP address. In addition, the support service may provide continuous availability and backup services for the mail server appliance.

30 Claims, 4 Drawing Sheets

MAIL SERVER APPLIANCE AND SUPPORT SERVICE

FIELD OF THE INVENTION

The present invention relates generally to electronic mail systems and methods.

BACKGROUND OF THE INVENTION

Today, electronic mail (email) is considered a critical application for any enterprise. Unfortunately, configuring and managing an email server is difficult. For example, setting up an email server typically requires obtaining a connection to the Internet and obtaining a static IP address. In addition, an enterprise probably must purchase a domain name, e.g., mycompany.com. This can take anywhere from a few hours to a few days depending on the top-level domain. Once the domain name has been obtained, the enterprise must then configure the domain's Domain Name System (DNS) mail exchanger (MX) records to point to the email server's static IP address.

Very likely, an enterprise must also configure their firewall to allow several types of connections, and to forward those connections to the server. Furthermore, an enterprise must ensure that their Internet service provider (ISP) allows DNS MX lookups and outgoing simple mail transport protocol (SMTP) connections, or configure the server to use the ISP's mail relay server.

An enterprise may also obtain a digital certificate, e.g., a SSL/X.509 certificate, for their domain and install it on their mail server so that users can securely check their email. Most enterprises obtain services of a backup mail server and update the domain's MX records with the backup server's details. This is so that if the enterprise's main email server is offline, mail does not get lost, but instead gets delivered to the backup server.

Unfortunately, this is a lot of complicated work that is likely beyond many enterprises. When managing a mail server, mistakes are common and can be difficult to diagnose. Many enterprises, such as small and medium businesses, lack the staff and resources to manage and troubleshoot their own mail server.

Some enterprises utilize a hosted solution in which they delegate of their email and mail servers to another party. However, hosted solutions have several limitations. Hosted solutions typically limit the control that an enterprise can have over their email and mail servers. This is because most hosted solutions utilize servers that are shared across multiple enterprises, and thus, no single enterprise can have total control of the email server in a typical hosted solution. Hosted solutions often limit (or charge increased costs) for higher amounts of storage space or for certain volumes of email. Mail servers can consume large amounts of storage or support large volumes of traffic. In these situations, hosted solutions can become quite expensive. Security is also another concern with hosted solutions. When using a hosted solution, an enterprise must often agree to the security policies of the hosting organization. Thus, there are many instances where a third party may be given access to sensitive email data of an enterprise.

It would therefore be desirable to provide a solution that allows an enterprise, an office, a small business, etc. to have control over their mail server, yet assists with the configuration and management of the mail server. In addition, it would be desirable to allow users to immediately begin using their mail server without any difficult configuration.

BRIEF DESCRIPTION OF THE DRAWINGS

The accompanying drawings, which are incorporated in and constitute a part of this specification, illustrate embodiments of the invention and together with the description, serve to explain the principles of the invention. In the figures.

DESCRIPTION OF THE EMBODIMENTS

In order to provide electronic mail that is easy to automatically setup, embodiments of the invention may provide a mail server appliance that is designed to operate with a support service. Each mail server appliance is pre-configured to use the support service as part of an integrated product. The mail server appliance is configured for ease of installation and maintenance and comprises the hardware bundled with the software applications pre-installed. The mail server appliance is also coupled to the support service and may begin operations almost immediately. The support service serves as the primary relay point for sending/receiving mail for the mail server appliance and provides various supporting features. First, it provides pre-installation services for the mail server appliance. For example, the support service provides a test environment and sub-domain for the mail server appliance. Second, the support service provides flexible operations support. For example, the support service allows the mail server appliance to have a dynamically assigned IP address. Third, the support service provides continuous availability and backup services for the mail server appliance. For example, the support service may provide one or more backup mail servers that assume operations of the mail server appliance when needed.

Figure 1:
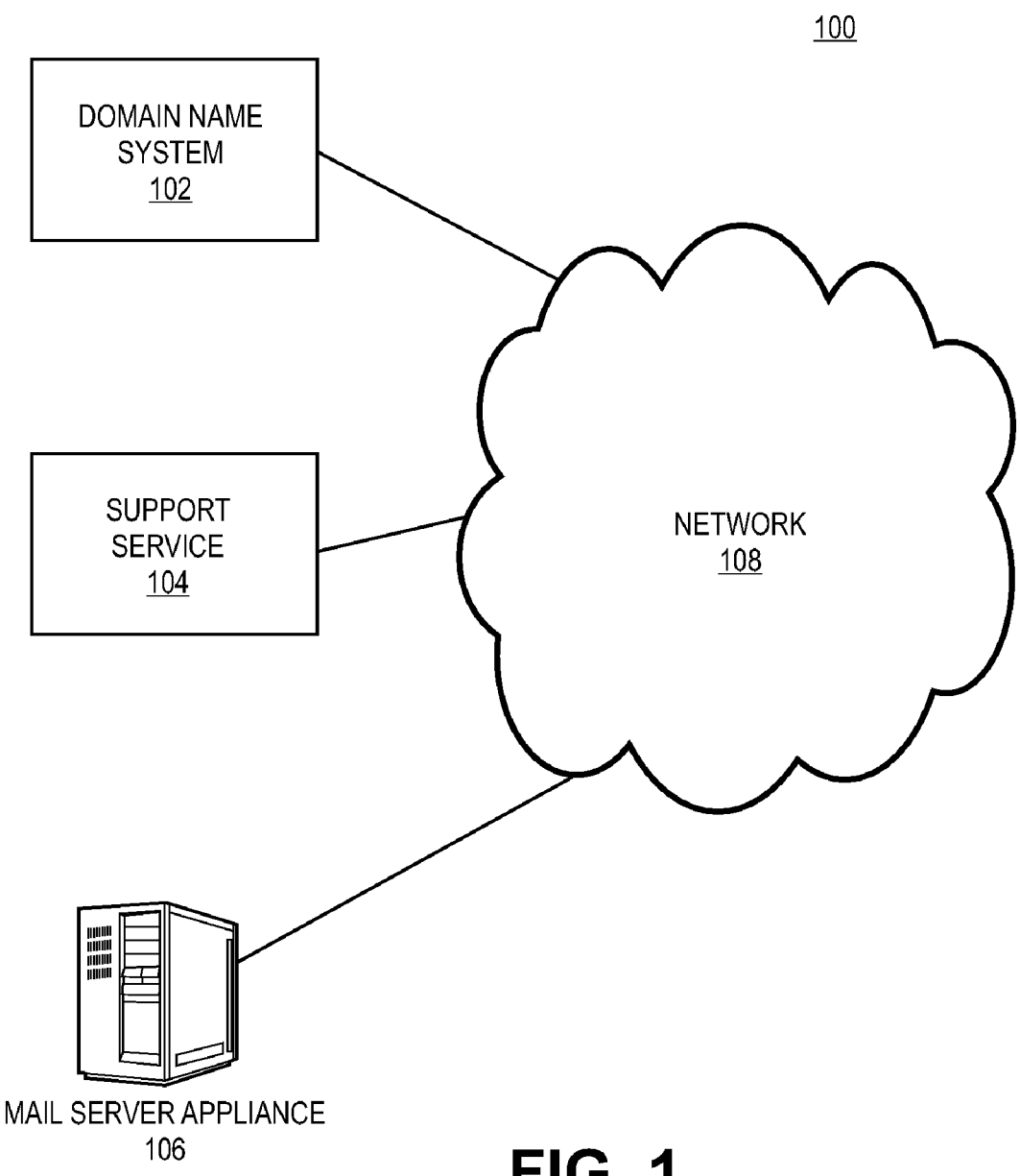
FIG. 1 is a system diagram for a mail server appliance operating in cooperation with a support service.
Figure 2:
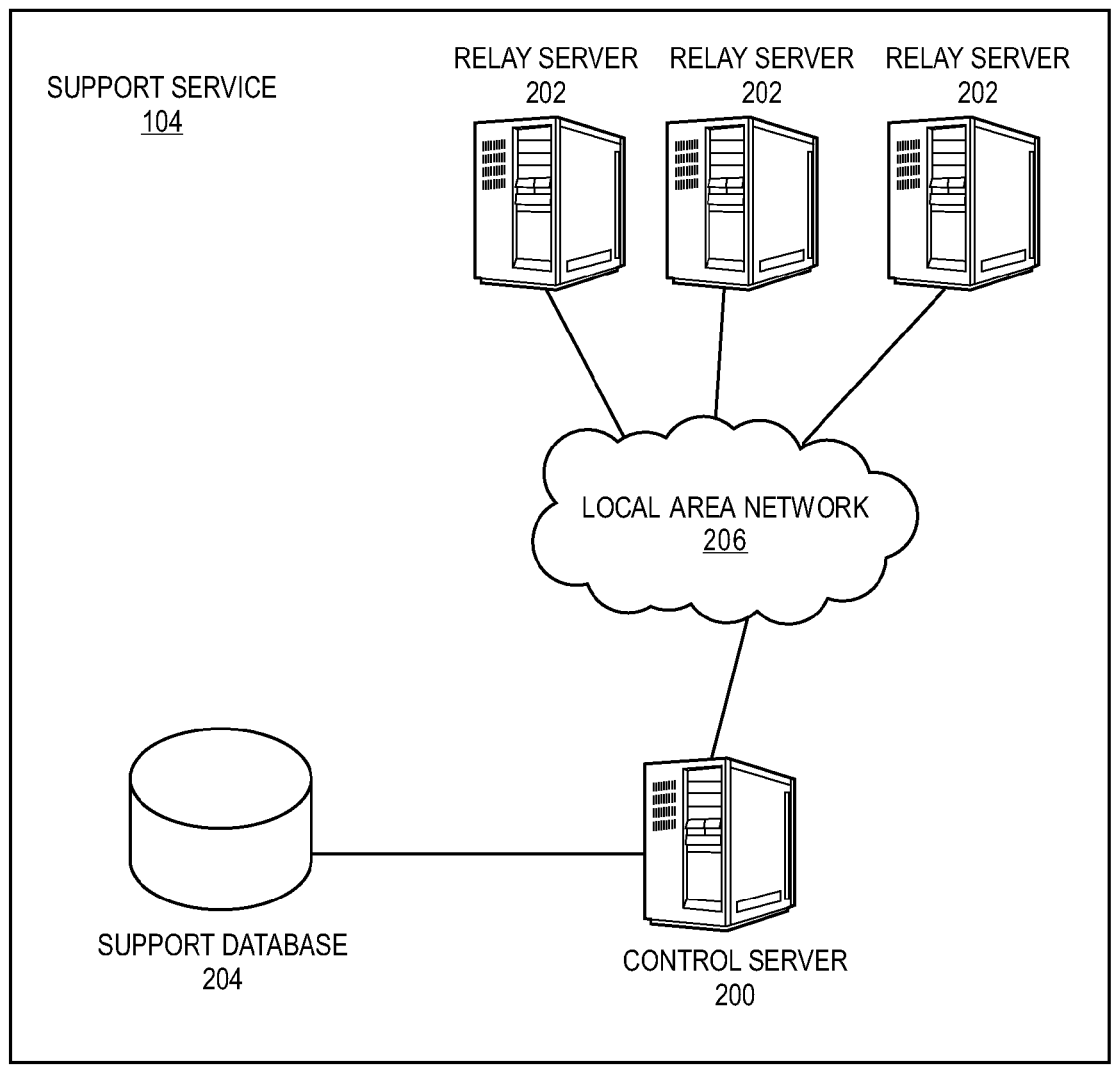
FIG. 2 shows an exemplary architecture for the support service of the mail server appliance.
Figure 3:
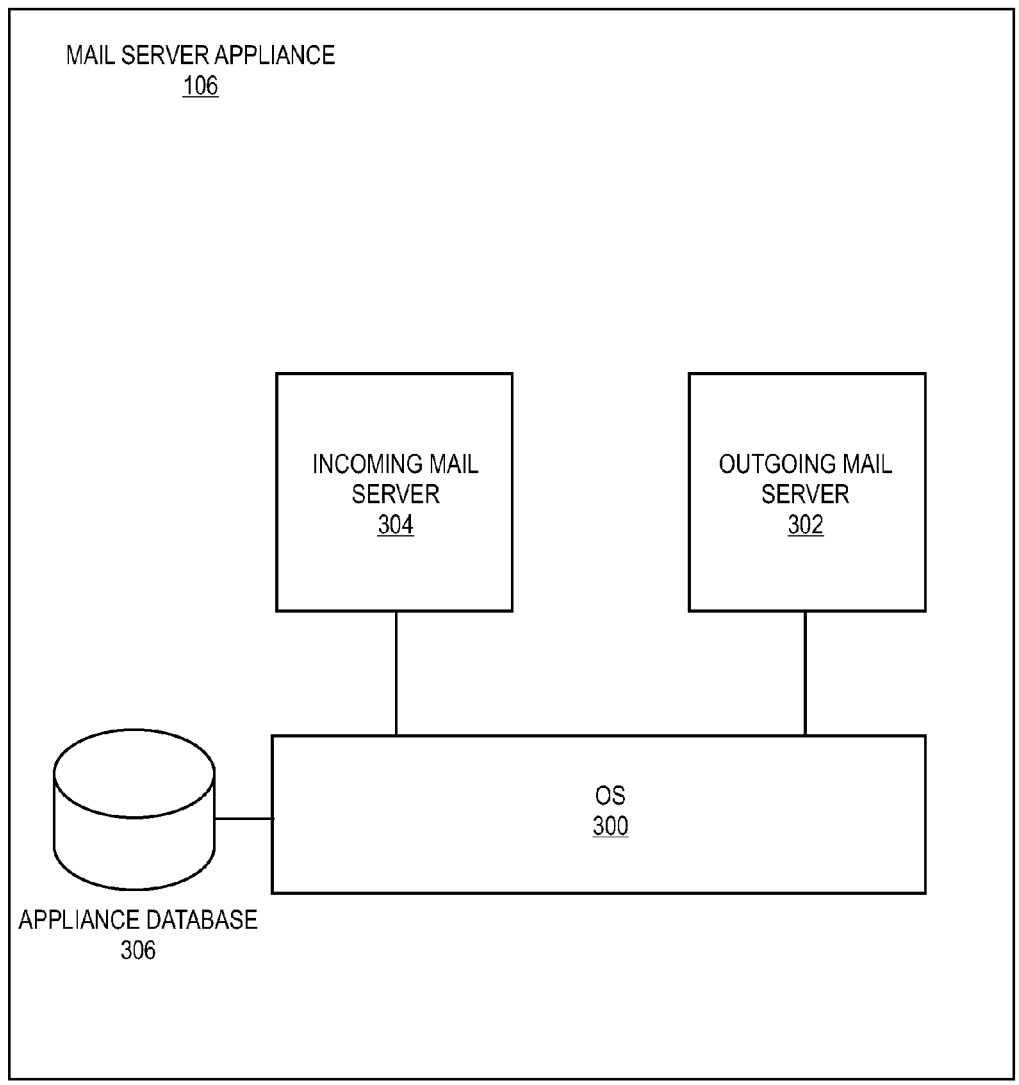
FIG. 3 shows an exemplary architecture for the mail server appliance.
Figure 4:
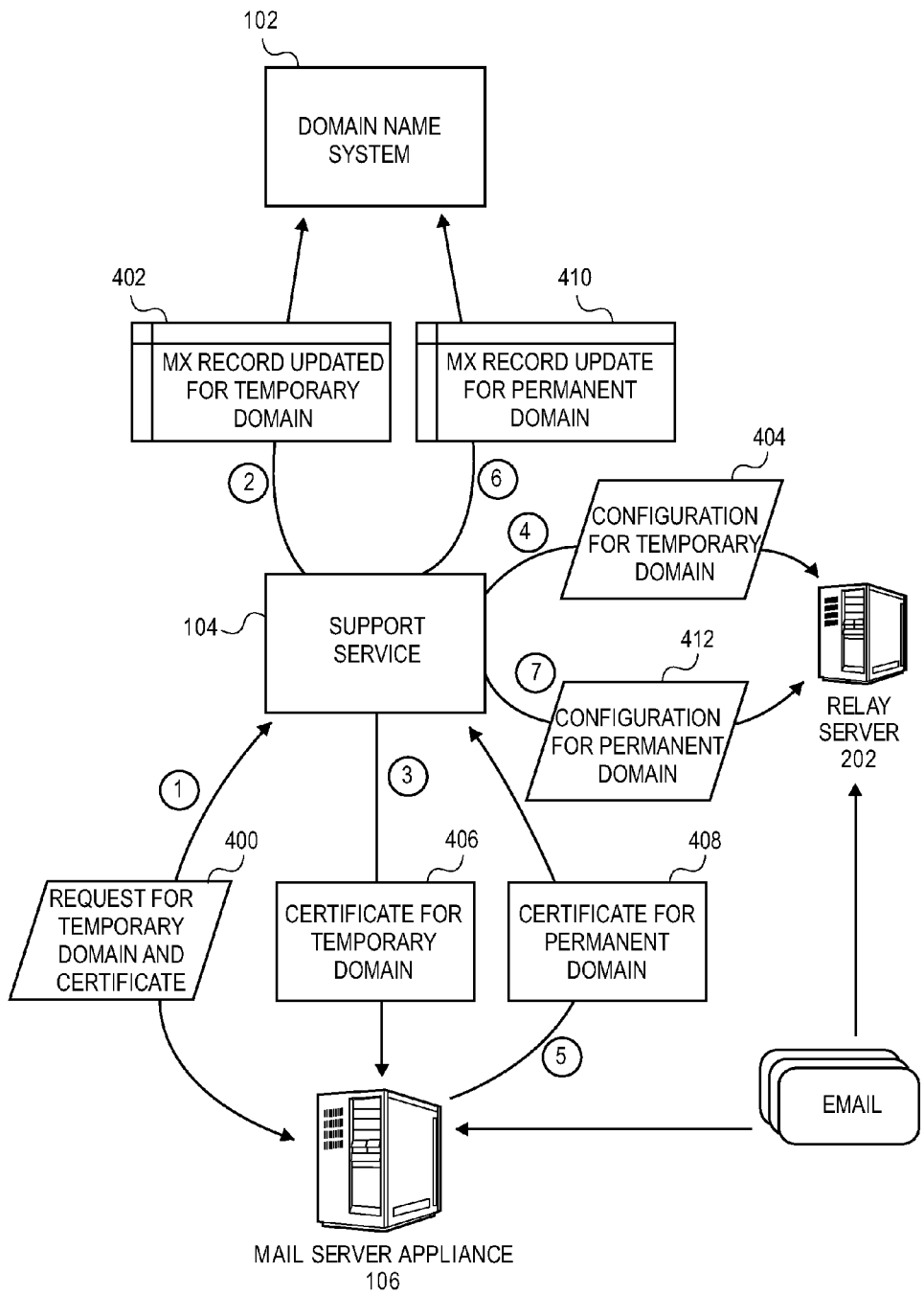
FIG. 4 illustrates a process flow for the mail server appliance and support service.

Reference will now be made in detail to the exemplary embodiments of the invention, which are illustrated in the accompanying drawings. Wherever possible, the same reference numbers will be used throughout the drawings to refer to the same or like parts. FIG. 1 illustrates an exemplary system diagram consistent with the principles of the present invention. FIG. 2 illustrates the architecture for the support service while FIG. 3 illustrates an exemplary mail server appliance. Finally, FIG. 4 illustrates a process flow for implementing the mail server appliance with the support service. Each of these figures will now be further described.

FIG. 1 is a system diagram for a mail server appliance operating in cooperation with a support service. As shown, system 100 may comprise a DNS 102, a support service 104, a mail server appliance 106. These components may be coupled together via a network 108. Of course one skilled in the art will recognize that system 100 may comprise other elements, such as servers, routers, hubs, etc. which are not shown. The components shown in FIG. 1 will now be briefly described.

DNS 102 is the system that stores and associates domain names to IP addresses on network 108 for system 100. DNS 102 also lists mail exchange servers accepting email for each domain using a mail exchanger (MX) record. DNS 102 comprises a hierarchical set of DNS servers (not shown). Each domain or sub-domain has one or more authoritative DNS servers that publish information about that domain and the name servers of any domains beneath it. DNS 102 and MX records are well known features of the Internet and well known to those skilled in the art.

For purposes of illustration, DNS 102 is shown external to support service 104. However, one skilled in the art will recognize that support service 104 may comprise one or more DNS servers. Thus, support service 104 may record the DNS changes and MX record changes for mail server appliance 106.

Support service 104 comprises the infrastructure for assisting mail server appliance 106. In some embodiments, support service 104 is implemented as a website or part of a website on the Internet. Accordingly, support service 104 may include any number of conventional servers. Such servers may be implemented with an Intel-based processor that executes an operating system, such as the LINUX operating system. As will be further described with reference to FIG. 2, support service 104 may comprise one or more mail relay servers that are configured to accept and relay email over network 108 for mail server appliance 106. Of course, one skilled in the art will recognize that support service 104 may include any amount of sufficient hardware. As noted, one example of the architecture for support service 104 is shown with reference to FIG. 2.

Mail server appliance 106 comprises the software and hardware to transfer email messages over network 108 to its various clients (not shown). Mail server appliance 106 is pre-configured to use support service 104 as part of an integrated solution for email. Mail server appliance 106 may be implemented with well known components of hardware and software. For example, mail server appliance 106 may be implemented on a general purpose computer comprising a processor, memory, storage, etc., that executes software, such as an operating system and applications, to serve as a mail server. As another example, mail server appliance 106 may be implemented as virtual machine running on a general purpose computer. Initially, mail server appliance 106 may be set up and running on a machine in support service 104. A user may then download software for mail server appliance 106 to a machine over network 108 as well as its configuration information from support service 104. Virtual machines and virtualization software, such as software by XenSource™, is known to those skilled in the art. Mail server appliance 106 is further described with reference to FIG. 3.

Network 108 provides a communication infrastructure for system 100. Network 108 may be implemented based on known topologies and components. For example, network 108 may primarily represent the networks that make up the Internet. In addition, network 108 may be implemented based on one or more local area networks, such as an Ethernet network, a wide area network, or the like. Of course, network 108 may include other well known network elements, such as firewalls, hubs, switches, and the like.

FIG. 2 shows an exemplary architecture for the support service 104 of the mail server appliance. Support service 104 may include a number of executable components and database structures useful for supporting mail server appliance 106. For example, support service 104 may comprise one or more DNS servers that serve as the authoritative DNS servers for the domains serviced by mail server appliance 106. Support service 104 may comprise one or more mail relay servers that provide authenticated SMTP connections for outgoing mail from mail server appliance 106 and incoming mail servers that can accept un-authenticated SMTP connections and either deliver the mail to mail server appliance or queue this mail. Support service 104 may comprise one or more On-Demand Mail Relay Protocol (ODMR) servers that allow dynamic IP connections with mail server appliance 106. Furthermore, support service 104 may comprise one or more certificate servers which signs certificate requests, tracks which certificates have been issued and exposes certificate revocation lists. These components may be coupled together, for example, by a local area network 206 or similar communications infrastructure. One embodiment of a basic configuration of support service 104 will now be further described with reference to FIG. 2.

As shown, support service 104 may include a control server 200, a set of relay servers 202, and a support database 204. These components may be implemented based on well known components of hardware and software and may be coupled together via a local area network, such as network 206, or a wide area network, such as network 108. For example, these components may be implemented as applications running on one or more conventional servers. In some embodiments, control server 200 and relay servers 202 of support service 104 run as applications on the LINUX operating system within one or more conventional servers. One skilled in the art will recognize that these servers may comprise a wide variety of processors, memory, storage, etc. necessary for the operations of support service 104. The functions of these exemplary components of support service will now be described.

Control server 200 is configured to manage communications between support service 104 and the other entities of system 100. For example, control server 200 may perform various functions for authenticating requests by mail server appliance 106, providing one or more domains to mail server appliance 106, issuing digital certificates, and interfacing with DNS 102 to update MX records on behalf of mail server appliance.

Control server 200 may be configured to communicate with mail server appliance 106 in a variety of ways. For example, control server 200 may be provided a static IP address for mail server appliance 106. Alternatively, control server 200 may be configured to allow communications from mail server appliance 106 based on a dynamic IP address and using the ODMR protocol, which is well known to those skilled in the art.

Relay servers 202 are configured to receive/send for the domain assigned to mail server appliance 106 and relay this email to email server appliance 106. Relay servers 202 may be implemented as a typical email server comprising an outgoing email server and an incoming server running. In some embodiments, relay servers 202 may be configured to deliver mail to mail server appliance 106 with a static IP address or a dynamic IP address. Relay servers 202 allow this flexibility of communications because mail server appliance 106 authenticated with support service 104. In addition, the outgoing email server in relay servers 202 may be implemented as a Simple Mail Transfer Protocol (SMTP) server. The incoming email server in servers 202 may be implemented as a Post Office Protocol (POP) server or Internet Mail Access Protocol (IMAP) server.

Support service 104 may include one or more databases, such as database 204. Database 204 may be implemented based on any known database technology, for example, as a relational or object oriented database. Of course, one skilled in the art will recognize that support service 104 may include or be coupled to other databases, such as a database that maintains information about mail server appliance 106, or information about users supported by mail server appliance 106.

Database 204 includes information related to authenticating mail server appliance 106, relay servers 202, and support service 104. For example, database 204 may store the public keys for mail server appliance 106. As noted, support service 104 and mail server appliance 106 may utilize the well known Public Key Infrastructure (PKI) encryption protocols to authenticate and communicate with each other. Other information that may be included in database 204 may comprise authorized administrators, contact information, and the like.

Database 204 may also optionally store a history of operations and configurations for mail server appliance 106. For example, database 204 may store a history of user accounts and event logs related to the operations of mail server appliance 106. In addition, database 204 may store information that indicates the hardware and software of mail server appliance 106, such as operating system versions, device drivers, BIOS, and the like.

FIG. 3 shows an exemplary architecture for the mail server appliance 106. As shown, the mail server appliance 106 may be similarly constructed as relay servers 202. Hence, mail server appliance may comprise an operating system 300, an outgoing email server 302 and an incoming email server 304.

Operating system (OS) 300 provides basic services for running email servers 302 and 304 on mail server appliance 106, such as drivers, basic input/output system code, a file system, and the like. OS 300 is an integrated collection of routines that service the sequencing and processing of programs. OS 300 may provide other services, such as resource allocation, scheduling, input/output control, and data management. OS 300 may be predominantly software, but may also comprise partial or complete hardware implementations and firmware. Well known examples of operating systems that are consistent with the principles of the present invention include GNU/Linux, AIX by IBM, and Sun Solaris by Sun Microsystems.

The outgoing email server 302 may be a SMTP server. The incoming email server 304 may be a POP3 or IMAP server or may be configured to use the secure socket layer version of these protocols, such as POPS and IMAPS.

As a SMTP server, outgoing email server 302 uses well-known port number 25 for communications over network 108 with support service 104 and relay servers 202. Likewise, incoming email server 304 listens on port 110, if implemented as a POP3 server, or on port 143 if implemented as an IMAP server.

During typical operation, support service 104 serves as the primary mail exchange point and then relays email to/from mail server appliance 106. For example, mail intended for mail server appliance 106 will be initially received by relay servers 202 in support service 104. When mail server appliance 106 requests its email, incoming mail server 304 will connect to relay servers 202. In some embodiments, mail server appliance 106 is configured to poll for its mail from support service 104 using ODMR regardless of whether it is provided a static IP address or dynamic IP address. Relay servers 202 and incoming mail server 304 will then transfer copies of the emails to mail server appliance 106. In some embodiments, relay servers 202 may also archive these email messages, for example, in support database 204.

In order to send email, outgoing email server 302 may use SMTP communications with relay servers 202 in support service 104. The relay servers 202 then serve as the outgoing mail relay for mail server appliance 106. In some embodiments, relay servers 202 are configured as an authenticated relay (or closed relay).

Mail server appliance 106 may also include an appliance database 306. For example, mail server appliance 106 may be shipped with its own unique public/private key pair stored in database 306 in order that it can be uniquely identified by support service 104.

The keys are also used to secure communications between support service 104 and appliance 106. This, for example, prevents a hacker from downloading mail for any given domain assigned to mail server appliance 106.

FIG. 4 illustrates a process flow between mail server appliance 106 and support service 104. In general, support service 104 initially provides a temporary domain name service so that appliance 106 can immediately begin sending and receiving email in advance of their permanent domain being registered and configured. Support service 104 automatically issues a public key certificate for the temporary domain to the appliance 106 so that its clients can securely authenticate it. Support service 104 records the IP address from which the certificate requests originate, and if needed, from which ODMR requests originate, so that support service 104 can attempt to relay mail directly to appliance 106. In some embodiments, appliance 106 is configured to default to polling for new email using ODMR in case an ISP or firewall configuration prevents the SMTP connection from support service 104 from succeeding. All outgoing mail is sent via support service 104 using relay servers 202 in case an ISP blocks outgoing unencrypted SMTP connections or MX lookups.

In some embodiments, the mail server appliance 106 operates as a virtual machine. In preparing the mail server appliance 106, the support service 104 may provide a testing environment and test sub-domain. This allows the customer to fully test and configure their desired setup for the mail server appliance 106. Once the setup has been finalized, the mail server appliance and its configuration are pre-installed and shipped to the customer. Alternatively, the mail server appliance 106 and configuration may be downloaded to a machine that has already been shipped to the customer. The support service 104 may also archive the mail server appliance 106 and configuration for backup operations. The support service 104 may also periodically synchronize the archives with the operational mail server appliance 106, for example, for disaster recovery purposes.

In stage 400, the mail server appliance requests a domain and a digital certificate. In some embodiments, the mail server appliance 106 is initially offered a sub-domain already owned by the support service 104. This permits instantaneous startup of operations. For example, a user or administrator of mail server appliance 106 may chooses a domain name and in response, the appliance 106 automatically contacts support service 104.

In response, the support service 104 determines if the requested domain is available. For example, control server 200 may query database 204 to see if the requested domain is available or if it has been assigned to another mail server appliance (not shown). If the domain is not available, then the support service may notify the mail server appliance that the domain is not available. If the domain is available, then support service 104 provides an acknowledgment that the requested domain is available. Alternatively, the support service 104 may simply proceed without further notice to the next stages.

If the request passes authentication, then support service 104 may allocate the requested domain to the mail server appliance 106. For example, control server 200 may record in database 204 that the domain has been assigned to the mail server appliance 106.

The mail server appliance 106 also requests a certificate asserting ownership of the requested domain. In some embodiments, the request includes the fingerprint of the public key of mail server appliance 106 and is signed private key of appliance 106. Such requests and their contents are well known to those skilled in the art. For example, the PKCS #10 standard is a certification request syntax standard and describes the syntax for a request for certification of a public key, a name, and possibly a set of attributes.

The support service 104 authenticates the request for the certificate. For example, control server 200 may verify that the public key fingerprint matches to appliance 106 and also verifies that the certificate request was signed using the corresponding private key of appliance 106. If both of these tests succeed, and the sub-domain is still available, control server 200 may allocate the requested domain to appliance 106. This effectively allows appliance 106 to immediately begin operations and/or testing.

If the request fails authentication, then control server 200 may deny the requested domain and/or the certificate. In addition, the control server 200 may provide a warning message that the request could not be authenticated.

In stage 402, the support service 104 communicates with DNS 102 and configures DNS entries with MX record updates. The MX records will specify that relay servers 202 of the support service 104 serve as the primary mail servers for the domain. The support service 104 may also optionally specify one or more of relay servers 202 as backup mail servers in the MX record. For example, support service 104 may configure the DNS 102 such that the MX records for that sub-domain points to relay servers 202. Of note, support service 104 may advertise the domain for mail server appliance 106 in DNS 102 at various times depending on the desired effect. For example, in some embodiments, support service 104 may wait until after mail server appliance 106 has been fully set up before advertising the domain to DNS 102. Alternatively, support service 104 may advertise the domain to DNS 102 earlier in order to allow operations immediately.

In stage 404, support service 104 configures relay servers 202 to accept mail for that sub-domain on behalf of appliance 106. Upon receipt of such mail, relay servers 202 would in turn attempt to deliver the mail by relaying it directly to the appliance using either the static IP address of appliance 106 or the recorded dynamic IP address. This relaying would be performed using SMTP over TLS so that the identity of appliance 106 could be authenticated based on its public key. If appliance 106 isn't available, or if authentication fails, relay servers 202 would queue the mail for future delivery. Control server 200 may also be configured to send a notification message, for example, to an administrative contact by email to a different address.

In stage 406, the support service 104 provides the certificate for the requested domain to the mail server appliance 106. This certificate then allows the mail server appliance to authenticate its ownership of the requested domain. In some embodiments, the certificate would be set to expire after a relatively short, fixed time period, e.g., 1 year.

Once configured to host a particular domain, the appliance 106 may then periodically poll support service 106 for new email using ODMR. In some embodiments, mail server appliance 106 authenticates support service 104 using the public key certificate of support service 104 and support service 104 could similarly authenticate appliance 106. If mail server appliance 106 uses dynamic IP address, support service 104 would record the IP address from which the ODMR requests originated and use that address next time it tries to relay mail using SMTP to appliance 106. Likewise, appliance 106 may be configured to relay outgoing mail through relay servers 202 in support service 104 using SMTP over TLS. However, in some embodiments, this configuration could be changed so that mail is relayed through another SMTP relay, or so that mail is sent directly by appliance 106 without a relay.

Eventually, mail server appliance 106 may switch to a permanent domain. As part of this configuration process, a public key certificate (and its associated private key) asserting ownership for the permanent domain is installed on appliance 106. In stage 408, this certificate would then be securely transferred to support service using the original public/private key pair and used for all further authentications. When support service 104 receives this certificate, in stage 410 it would update the MX records in DNS 102 to have relay servers 202 server as the primary mail servers for the new domain. In addition, in stage 412, configurations of relay servers 202 are updated to accept and relay mail for that permanent domain.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method of configuring a mail server appliance for operation with a support service, comprising:
   receiving a request for a domain name from the support service to be assigned to the mail server appliance;
   receiving a request for a certificate for the mail server appliance that asserts ownership of the requested domain name;
   authenticating the request for the certificate from the mail server appliance;
   assigning the requested domain name to the mail server appliance based on whether the request has been authenticated and whether the domain name is available;
   recording a mail exchange record for the assigned domain name that points to mail servers of the support service;
   configuring mail servers of the support service to accept and relay mail for the requested domain name to the mail server appliance;
   receiving an ODMR request from the mail server appliance;
   recording an address from which the ODMR request originated; and
   relaying mail to the recorded address for the domain owned by the mail server appliance.

2. The method of claim 1, further comprising:
   receiving a certificate for a second domain that is owned by the mail server appliance; and
   configuring the mail servers of the support service to accept and relay mail for the second domain to the mail server appliance.

3. The method of claim 2, wherein receiving the certificate for the second domain that is owned by the mail server appliance comprises authenticating the certificate based on a key assigned to the mail server appliance.

4. The method of claim 1, wherein receiving the request for the domain name from the support service comprises receiving a request for a sub-domain of a domain owned by the support service.

5. The method of claim 1, further comprising authenticating the ODMR request, and wherein relaying mail to the recorded address for the domain owned by the mail server appliance comprises relaying mail to the recorded address for the domain owned by the mail server appliance based on the authentication of the ODMR request.

6. A non-transitory computer-readable medium comprising instructions for causing a computer to perform the method of claim 1.

7. A method of configuring a mail server appliance for operation with a support service, said method comprising:

receiving a request for a domain name from the support service to be assigned to the mail server appliance;

receiving a request for a certificate for the mail server appliance that asserts ownership of the requested domain name;

authenticating the request for the certificate from the mail server appliance;

assigning the requested domain name to the mail server appliance based on whether the request has been authenticated and whether the domain name is available;

recording a mail exchange record for the assigned domain name that points to mail servers of the support service; and configuring mail servers of the support service to accept and relay mail for the requested domain name to the mail server appliance;

receiving an ODMR request from the mail server appliance;

recording an address from which the ODMR request originated; and relaying mail to the recorded address for the domain owned by the mail server appliance;

the configuring comprising:

determining an availability of communications between the support service and the mail server appliance, and queuing mail for the mail server appliance based on the availability of communications between the support service and the mail server appliance.

8. The method of claim 7, further comprising:

receiving a certificate for a second domain that is owned by the mail server appliance; and configuring the mail servers of the support service to accept and relay mail for the second domain to the mail server appliance.

9. The method of claim 8, wherein receiving the certificate for the second domain that is owned by the mail server appliance comprises authenticating the certificate based on a key assigned to the mail server appliance.

10. The method of claim 7, wherein receiving the request for the domain name from the support service comprises receiving a request for a sub-domain of a domain owned by the support service.

11. A method of configuring a mail server appliance for operation with a support service, said method comprising:

receiving a request for a domain name from the support service to be assigned to the mail server appliance;

receiving a request for a certificate for the mail server appliance that asserts ownership of the requested domain name;

authenticating the request for the certificate from the mail server appliance;

assigning the requested domain name to the mail server appliance based on whether the request has been authenticated and whether the domain name is available;

recording a mail exchange record for the assigned domain name that points to mail servers of the support service; and configuring mail servers of the support service to accept and relay mail for the requested domain name to the mail server appliance;

receiving an ODMR request from the mail server appliance;

recording an address from which the ODMR request originated; and relaying mail to the recorded address for the domain owned by the mail server appliance;

the configuring comprising:

determining if the mail server appliance has failed to authenticate its request for mail, and queuing mail for the mail server appliance when the mail server appliance has failed to authenticate.

12. The method of claim 11, further comprising:

receiving a certificate for a second domain that is owned by the mail server appliance; and configuring the mail servers of the support service to accept and relay mail for the second domain to the mail server appliance.

13. The method of claim 12, wherein receiving the certificate for the second domain that is owned by the mail server appliance comprises authenticating the certificate based on a key assigned to the mail server appliance.

14. The method of claim 11, wherein receiving the request for the domain name from the support service comprises receiving a request for a sub-domain of a domain owned by the support service.

15. A support service system for configuring a mail server appliance for operation with a support service comprising:

a database storing private and public key pairs assigned to a mail server appliance;

a server configured to:

host a domain name and associated records for the mail server appliance, and determine an availability of communications between the support service and the mail server appliance;

receive a request for a domain name from the support service to be assigned to the mail server appliance;

receive a request for a certificate for the mail server appliance that asserts ownership of the requested domain name;

authenticate the request for the certificate from the mail server appliance;

assign the requested domain name to the mail server appliance based on whether the request has been authenticated and whether the domain name is available;

record a mail exchange record for the assigned domain name that points to mail servers of the support service; and configure mail servers of the support service to accept and relay mail for the requested domain name to the mail server appliance by determining an availability of communications between the support service and the mail server appliance;

receive an ODMR request from the mail server appliance;

record an address from which the ODMR request originated; and relay mail to the recorded address for the domain owned by the mail server appliance;

a set of mail servers configured to:

accept mail for the domain name to the mail server appliance, and queue mail for the mail server appliance based on the availability of communications between the support service and the mail server appliance.

16. The support service system of claim 15, wherein the server is configured to provide a digital certificate to the mail server appliance that grants ownership of the domain name to the mail server appliance.

17. The support service system of claim 15, wherein the server is configured to provide a temporary sub-domain name for the mail server appliance.

18. The support service system of claim 15, wherein the server is configured to record a MX record for the domain name provided to the mail server appliance.

19. The support service system of claim 15, wherein the server is configured to record a MX record that specifies at least one of the set of mail servers as a primary mail server for mail of the domain name provided to the mail server appliance.

20. The support service system of claim 15, wherein the server is configured to record a MX record that specifies at least one of the set of mail servers as a backup mail server for mail of the domain name provided to the mail server appliance.

21. The support service system of claim 15, wherein the server is configured to authenticate the mail server appliance based on a key assigned to the mail server appliance.

22. The support service system of claim 15, wherein the server is configured to accept a digital certificate from the mail server appliance that asserts ownership of a new domain name and to record a MX record that specifies at least one of the mail servers as a primary mail server for the new domain name based on the digital certificate.

23. A support service system for configuring a mail server appliance for operation with a support service comprising:
 a database storing private and public key pairs assigned to a mail server appliance;
 a server configured to:
  host a domain name and associated records for the mail server appliance;
  receive a request for a domain name from the support service to be assigned to the mail server appliance;
  receive a request for a certificate for the mail server appliance that asserts ownership of the requested domain name;
  authenticate the request for the certificate from the mail server appliance;
  assign the requested domain name to the mail server appliance based on whether the request has been authenticated and whether the domain name is available;
  record a mail exchange record for the assigned domain name that points to mail servers of the support service;
  configure mail servers of the support service to accept and relay mail for the requested domain name to the mail server appliance;
  receive an ODMR request from the mail server appliance;
  record an address from which the ODMR request originated; and
  relay mail to the recorded address for the domain owned by the mail server appliance;
 a set of mail servers configured to—
  accept mail for the domain name to the mail server appliance, and
  allow mail to be downloaded by the mail server appliance using ODMR.

24. The support service system of claim 23, wherein the server is configured to provide a digital certificate to the mail server appliance that grants ownership of the domain name to the mail server appliance.

25. The support service system of claim 23, wherein the server is configured to provide a temporary sub-domain name for the mail server appliance.

26. The support service system of claim 23, wherein the server is configured to record a MX record for the domain name provided to the mail server appliance.

27. The support service system of claim 23, wherein the server is configured to record a MX record that specifies at least one of the set of mail servers as a primary mail server for mail of the domain name provided to the mail server appliance.

28. The support service system of claim 23, wherein the server is configured to record a MX record that specifies at least one of the set of mail servers as a backup mail server for mail of the domain name provided to the mail server appliance.

29. The support service system of claim 23, wherein the server is configured to authenticate the mail server appliance based on a key assigned to the mail server appliance.

30. The support service system of claim 23, wherein the server is configured to accept a digital certificate from the mail server appliance that asserts ownership of a new domain name and to record a MX record that specifies at least one of the mail servers as a primary mail server for the new domain name based on the digital certificate.

* * * * *